(12) United States Patent
Takashima et al.

(10) Patent No.: US 10,375,809 B2
(45) Date of Patent: Aug. 6, 2019

(54) EXTREME ULTRAVIOLET LIGHT GENERATION DEVICE AND METHOD FOR CONTROLLING EXTREME ULTRAVIOLET LIGHT GENERATION DEVICE

(71) Applicant: Gigaphoton Inc., Tochigi (JP)

(72) Inventors: Yuta Takashima, Oyama (JP); Yoshifumi Ueno, Oyama (JP); Go Shirozu, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 16/156,356

(22) Filed: Oct. 10, 2018

(65) Prior Publication Data

US 2019/0045616 A1 Feb. 7, 2019

Related U.S. Application Data

(63) Continuation of application No. PCT/JP2016/066017, filed on May 31, 2016.

(51) Int. Cl.
*H05G 2/00* (2006.01)
*H01S 3/09* (2006.01)

(52) U.S. Cl.
CPC .............. *H05G 2/008* (2013.01); *H01S 3/09* (2013.01); *H05G 2/00* (2013.01); *H05G 2/003* (2013.01)

(58) Field of Classification Search
USPC ..................................................... 250/504 R
See application file for complete search history.

(56) References Cited

U.S. PATENT DOCUMENTS

| | | |
|---|---|---|
| 2012/0175533 A1 | 7/2012 | Moriya et al. |
| 2013/0051412 A1 | 2/2013 | Miyao et al. |
| 2014/0077099 A1 | 3/2014 | Hori et al. |
| 2014/0098830 A1 | 4/2014 | Yabu et al. |
| 2014/0253716 A1 | 9/2014 | Saito et al. |
| 2017/0171955 A1 | 6/2017 | Ueno et al. |

(Continued)

FOREIGN PATENT DOCUMENTS

| | | |
|---|---|---|
| JP | H11-312831 A | 11/1999 |
| JP | 2012-191171 A | 10/2012 |

(Continued)

OTHER PUBLICATIONS

International Search Report issued in PCT/JP2016/066017; dated Aug. 2, 2016.
Written Opinion issued in PCT/JP2016/066017; dated Aug. 2, 2016.

*Primary Examiner* — Kiet T Nguyen
(74) *Attorney, Agent, or Firm* — Studebaker & Brackett PC

(57) ABSTRACT

An extreme ultraviolet light generating apparatus includes a laser device, a target detector, and a controller. The laser device emits a pulsed laser beam. The target detector detects a target substance supplied as an application target for the laser beam to the inside of a chamber. The controller controls the laser device based on a burst signal in which a burst period and an idle period are repeated. In the burst period, an extreme ultraviolet light beam has to be generated. In the idle period, the generation of the extreme ultraviolet light beam has to be paused. When a size of a target substance detected at the target detector in the idle period is greater than a predetermined size, the controller may reduce an intensity of a laser beam entering the inside of the chamber from the laser device.

7 Claims, 9 Drawing Sheets

(56) References Cited

U.S. PATENT DOCUMENTS

2018/0199422 A1* 7/2018 Yabu ................. H05G 2/00
2018/0284618 A1* 10/2018 Hosoda ............. G03F 7/70033

FOREIGN PATENT DOCUMENTS

| JP | 2013-004258 A | 1/2013 |
| JP | 2014-078394 A | 5/2014 |
| JP | 2014-175474 A | 9/2014 |
| JP | 2015-015251 A | 1/2015 |
| WO | 2016/063409 A1 | 4/2016 |

* cited by examiner

)
EXTREME ULTRAVIOLET LIGHT GENERATION DEVICE AND METHOD FOR CONTROLLING EXTREME ULTRAVIOLET LIGHT GENERATION DEVICE

CROSS-REFERENCE TO RELATED APPLICATIONS

The present application is a continuation application of International Application No. PCT/JP2016/066017 filed on May 31, 2016. The content of the application is incorporated herein by reference in its entirety.

BACKGROUND

1. Technical Field

The present disclosure relates to an extreme ultraviolet light generating apparatus and a method for controlling an extreme ultraviolet light generating apparatus.

2. Related Art

Nowadays, transfer patterns for use in photolithography in semiconductor processes are becoming finer and finer with semiconductor processes being moved to microfabrication. In next generation processes, fine patterning with a line width of 20 nm or less is to be requested. Thus, the development of exposure apparatuses is expected. These exposure apparatuses combine a device that generates extreme ultraviolet (EUV) light at a wavelength of about 13 nm with reduced projection reflective optics.

For extreme ultraviolet light generating apparatuses, three types of devices are proposed. The three types are: a laser produced plasma (LPP) device that uses plasma generated by applying a laser beam to a target substance; a discharge produced plasma (DPP) device that uses plasma generated by electric discharge; and a synchrotron radiation (SR) device that uses synchrotron orbital radiation.

CITATION LIST

Patent Literature

[Patent Literature 1] JP H11-312831 A
[Patent Literature 2] JP 2014-175474 A
[Patent Literature 3] JP 2015-015251 A

SUMMARY

An extreme ultraviolet light generating apparatus according to one aspect of the present disclosure may include a laser device, a target detector, and a controller. The laser device may be configured to emit a pulsed laser beam. The target detector may be configured to detect a target substance supplied as an application target for the laser beam to an inside of a chamber. The controller may be configured to control the laser device based on a burst signal in which are repeated a burst period for which to generate an extreme ultraviolet light beam and an idle period for which to pause the generation of the extreme ultraviolet light beam. When a size of a target substance detected at the target detector in the idle period is greater than a predetermined size, the controller may reduce an intensity of a laser beam entering the inside of the chamber from the laser device.

A method for controlling an extreme ultraviolet light generating apparatus according to one aspect of the present disclosure may include: detecting a target substance supplied as an application target for a laser beam to an inside of a chamber in an idle period, of the idle period for which generation of the extreme ultraviolet light beam has to be paused and a burst period for which an extreme ultraviolet light beam has to be generated; and reducing an intensity of a laser beam entering the inside of the chamber in the burst period when a size of the target substance is greater than a predetermined size.

BRIEF DESCRIPTION OF THE DRAWINGS

In the following, some embodiments of the present disclosure will be described as simple examples with reference to the accompanying drawings.

DETAILED DESCRIPTION

1. Overview
2. Description of an Extreme Ultraviolet Light Generating Apparatus
   2.1 Overall Configuration
   2.2 Operation
3. Comparative Example
   3.1 Configuration of a Part of an Extreme Ultraviolet Light Generating Apparatus
   3.2 Operation
   3.3 Problem
4. First Embodiment
   4.1 Configuration of a Part of an Extreme Ultraviolet Light Generating Apparatus
   4.2 Operation
   4.3 Effect
5. Second Embodiment
   5.1 Configuration of a Part of an Extreme Ultraviolet Light Generating Apparatus
   5.2 Operation
   5.3 Effect
6. Exemplifying Modification In the following, embodiments of the present disclosure will be described in detail with reference to the drawings.

The embodiments to be described below show some examples of the present disclosure, and do not limit the content of the present disclosure. All the configurations and the operations to be described in the embodiments are not necessarily required as the configurations and operations of the present disclosure.

The same components are designated by the same reference signs, and redundant descriptions will be omitted.

1. Overview

Embodiments of the present disclosure relate to an extreme ultraviolet light generating apparatus that generates light with wavelengths referred to as extreme ultraviolet (EUV) light. Note that in the present specification below, the extreme ultraviolet light is referred to as EUV light.

2. Description of an Extreme Ultraviolet Light Generating Apparatus

2.1 Overall Configuration

Figure 1:
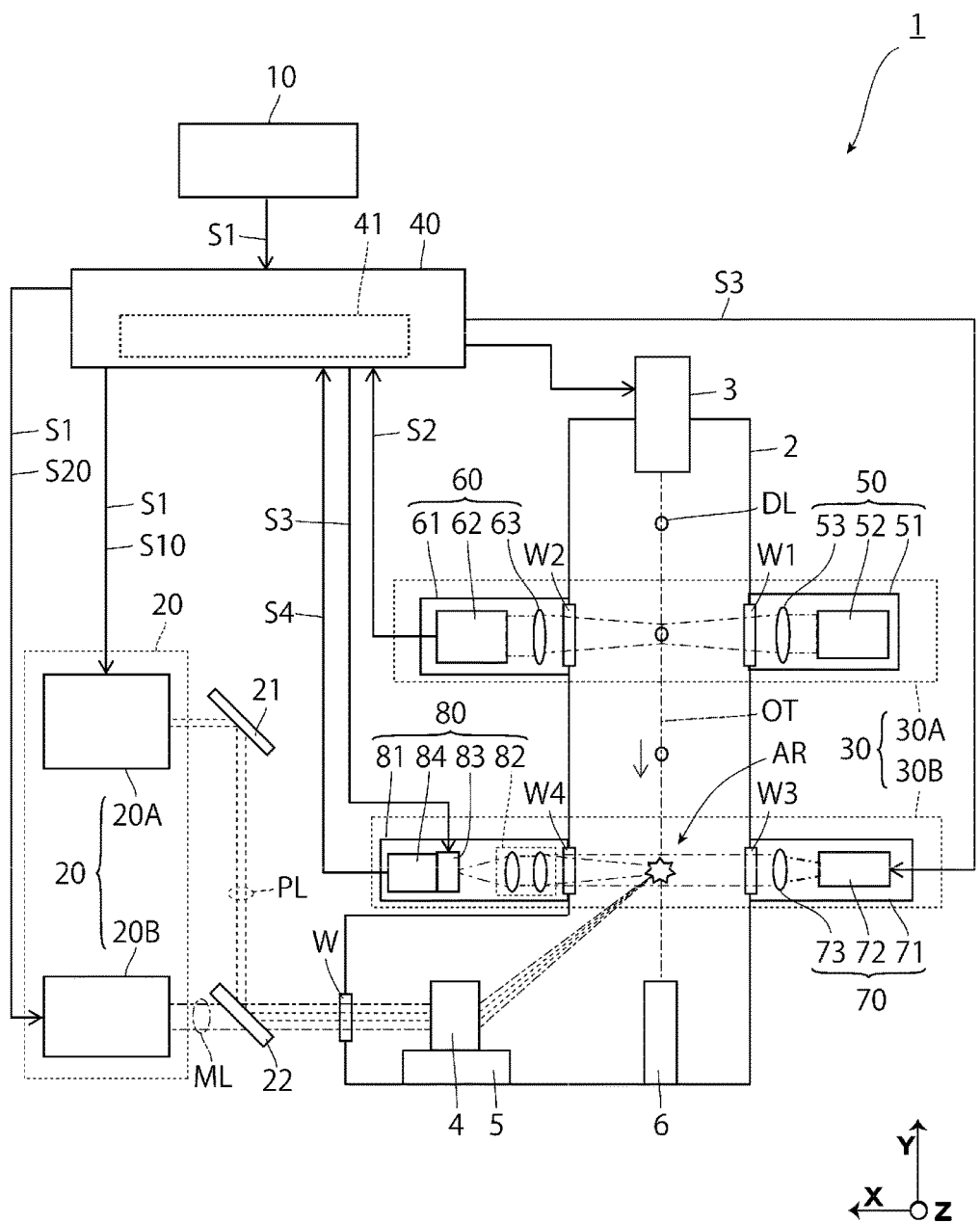
FIG. 1 is a schematic diagram of an exemplifying configuration of an extreme ultraviolet light generating apparatus.

As illustrated in FIG. 1, an extreme ultraviolet light generating apparatus 1 according to this embodiment is used together with an exposure apparatus 10. The exposure apparatus 10 is an apparatus that exposes a semiconductor wafer with EUV light generated in the extreme ultraviolet light generating apparatus 1. The exposure apparatus 10 outputs a burst signal S1 to the extreme ultraviolet light generating apparatus 1.

Figure 2:
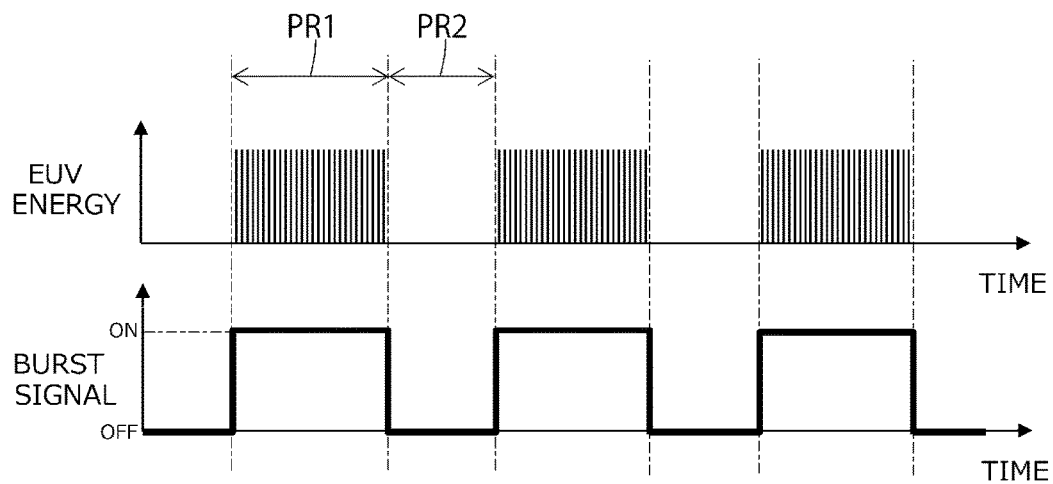
FIG. 2 is a diagram of a burst signal.

As illustrated in FIG. 2, the burst signal S1 is a signal that specifies a burst period PR1 for which EUV light has to be generated and an idle period PR2 for which the generation of EUV light has to be stopped. In the burst signal, the burst period PR1 and the idle period PR2 are repeated. The burst pattern is defined by any one of the energy of EUV light, the repetition frequency, the number of pulses, the length of the burst period PR1, the length of the idle period PR2, and the number of bursts or by data including a plurality of these parameters. The settings of the burst pattern are established in the exposure apparatus 10. Note that, the operation of the extreme ultraviolet light generating apparatus 1 based on the burst signal S1 is sometimes referred to as a burst operation.

The extreme ultraviolet light generating apparatus 1 applies a laser beam to a target substance that is a substance to be applied in the burst period PR1 of the burst signal, turns the target substance into plasma, and generates light including EUV light from the plasma. Note that there is a method in which after a prepulsed laser beam is applied to a target substance and the target substance is dispersed, a main pulsed laser beam is applied to the dispersed target substance, and the dispersed target substance is turned into plasma. In this case, this method enables the improvement of conversion efficiency (CE) from laser beam energy into EUV light energy.

As illustrated in FIG. 1 and described in detail below, the extreme ultraviolet light generating apparatus 1 includes a chamber 2 and a target supply unit 3. The chamber 2 is a sealable container. The target supply unit 3 is configured to supply a target substance as a droplet DL to the inside of the chamber 2. The target supply unit 3 is mounted so as to penetrate through the wall of the chamber 2, for example. The material of a target substance to be supplied from the target supply unit 3 may include, but is not limited to, any one of tin, terbium, gadolinium, lithium, and xenon, or a combination of two or more of them.

On the wall of the chamber 2, at least one through hole is provided. The through hole is blocked with a window W. The window W transmits light that propagates from the outside of the chamber 2.

At the inside of the chamber 2, a laser focusing optical system 4, a stage 5, and a target collecting unit 6 are included. The laser focusing optical system 4 is an optical system that focuses a prepulsed laser beam PL and a main pulsed laser beam ML entered from the window W on a plasma generation region AR. The laser focusing optical system 4 is mounted on the stage 5. Note that the laser focusing optical system 4 can be configured of an off-axis paraboloid mirror and a planner mirror, for example.

The stage 5 is provided at the inside of the chamber 2 so that the stage 5 can move in two directions, the Y-axis and the Z-axis orthogonal to each other. The stage 5 can change the focus position in the plasma generation region AR at which the laser focusing optical system 4 mounted on the stage 5 achieves a focus. Note that the stage 5 may be movable in the directions of these three axes, the Y-axis, the Z-axis, and the Z-axis orthogonal to each other. The Z-axis is the direction in which the EUV light generated in the plasma generation region AR is guided to the exposure apparatus 10, for example.

The target collecting unit 6 is configured to collect droplets DL that are not turned into plasma in the plasma generation region AR among the droplets DL having been supplied to the inside of the chamber 2. For example, the target collecting unit 6 is provided on the wall of the chamber 2 on the opposite side to the wall where the target supply unit 3 is mounted, and provided on the extension in the direction in which the droplet DL travels.

The extreme ultraviolet light generating apparatus 1 includes a laser device 20, a reflective mirror 21, and a beam combiner 22. The laser device 20, the reflective mirror 21, and the beam combiner 22 are placed on the outside of the chamber 2.

The laser device 20 includes a prepulse laser device 20A and a main pulse laser device 20B. The prepulse laser device 20A is configured to emit the prepulsed laser beam PL having a predetermined pulse duration. For example, the prepulse laser device 20A may be a solid laser device, such as a Nd:YAG laser or a Nd:YVO4 laser, or may emit the harmonic light of a solid laser device. For example, the prepulse laser device 20A may be a gas laser device, such as a $CO_2$ laser or an excimer laser. For example, the prepulse laser device 20A may emit a linearly polarized laser beam. Note that the pulse duration may be a pico-second pulse duration that is 100 fS or more and less than 1 nS, or may be a nano-second pulse duration that is 1 nS or more.

The main pulse laser device 20B is configured to emit the main pulsed laser beam ML having a predetermined pulse duration. Examples of the main pulse laser device 20B that are applicable include laser devices described as examples of the prepulse laser device 20A. The main pulsed laser beam ML may have a wavelength different from the wavelength of the prepulsed laser beam PL, or may have a pulse duration different from the pulse duration of the prepulsed laser beam PL.

The reflective mirror 21 is a mirror that reflects the prepulsed laser beam PL emitted from the prepulse laser device 20A at a high reflectance. For example, the reflective mirror 21 can be configured of a flat dielectric multi-layer film, a metal, or any other material.

The beam combiner 22 is placed so as to approximately align the optical path axis of the prepulsed laser beam PL with the optical path axis of the main pulsed laser beam ML.

For example, the beam combiner 22 is configured to transmit the main pulsed laser beam ML emitted from the main pulse laser device 20B and reflect the main pulsed laser beam ML in such a manner that the optical path axis of the prepulsed laser beam PL reflected off the reflective mirror 21 is approximately aligned with the optical path axis of the main pulsed laser beam ML.

The extreme ultraviolet light generating apparatus 1 includes a target detector 30 and a controller 40. The target detector 30 has a droplet detector 30A configured to detect the droplet DL travelling to the plasma generation region AR and an image acquiring device 30B configured to acquire the image of a region including the plasma generation region AR.

The droplet detector 30A is configured of, for example, a light source unit 50 and a light receiving unit 60. The light source unit 50 is placed on the side where a window W1 is provided. The light receiving unit 60 is placed on the side where a window W2 is provided. The paired windows W1 and W2 are provided opposed to each other across a trajectory OT of the droplet DL to be supplied to the inside of the chamber 2.

The light source unit 50 includes, for example, a container 51, and a continuous-wave (CW) laser 52 and an illuminating optical system 53 that are placed at the inside of the container 51. The light source unit 50 focuses the laser beam emitted from the CW laser 52 on a predetermined detection region located on the target supply unit 3 side of the plasma generation region AR on the trajectory OT of the droplet DL using the illuminating optical system 53.

The light receiving unit 60 includes, for example, a container 61, and a light receiving optical system 62 and an optical sensor 63 that are placed at the inside of the container 61. The light receiving unit 60 guides light in the detection region to the optical sensor 63 through the light receiving optical system 62, and detects a change in the light that occurs while the droplet DL is passing through the detection region. A DL passage signal S2 that indicates a change in the light is outputted from the droplet detector 30A to the controller 40. Note that the controller 40 recognizes that the droplet DL has passed through the detection region based on the DL passage signal S2.

The image acquiring device 30B is configured of, for example, a light source unit 70 and a light receiving unit 80. The light source unit 70 is placed on the side where a window W3 is provided. The light receiving unit 80 is placed on the side where a window W4 is provided. The paired windows W3 and W4 are provided opposed to each other across the plasma generation region AR on the trajectory OT of the droplet DL.

The light source unit 70 includes, for example, a container 71, and a flash lamp 72 and an illuminating optical system 73 that are placed at the inside of the container 71. The light source unit 70 lights the flash lamp 72 based on an imaging timing signal S3 supplied from the controller 40 to the flash lamp 72, collimates light emitted from the flash lamp 72 through the illuminating optical system 73, and guides the light to the plasma generation region AR.

The light receiving unit 80 includes, for example, a container 81, and a light receiving optical system 82, a shutter 83, and an image sensor 84 that are placed at the inside of the container 81. The light receiving unit 80 opens the shutter 83 based on the imaging timing signal S3 supplied from the controller 40 to the shutter 83, and forms the image of the plasma generation region AR on the image sensor 84 through the light receiving optical system 82 when the shutter 83 is kept opened. The light receiving unit 80 outputs the image formed on the image sensor 84 as an image signal S4 to the controller 40.

The controller 40 is configured to generally control the overall extreme ultraviolet light generating apparatus 1, including a delay circuit 41, a central processing unit (CPU), not shown, and any other component as main components. The controller 40 receives inputs of the burst signal S1 supplied from the exposure apparatus 10, the DL passage signal S2 supplied from the droplet detector 30A, and the image signal S4 supplied from the image acquiring device 30B.

The controller 40 appropriately controls the target supply unit 3, the laser device 20, and the target detector 30 based on the burst signal S1, the DL passage signal S2, and the image signal S4 in such a manner that the laser beam is applied when the droplet DL reaches the plasma generation region AR in the burst period.

For example, the controller 40 outputs the burst signal S1 supplied from the exposure apparatus 10 to the prepulse laser device 20A. In addition to this, the controller 40 generates a first light emission trigger signal S10 when receiving an input of the DL passage signal S2, delays the first light emission trigger signal S10 by a predetermined delay time using the delay circuit 41, and then outputs the signal S10 to the prepulse laser device 20A. The delay time is a time period obtained such that a time period for which the prepulsed laser beam PL reaches the plasma generation region AR after the prepulse laser device 20A receives the first light emission trigger signal S10 is subtracted from a time period for which the droplet DL present in the detection region of the droplet detector 30A reaches the plasma generation region AR. As described later, the prepulse laser device 20A is configured to emit the prepulsed laser beam PL after receiving an input of the first light emission trigger signal S10 in the burst period PR1, notification of which is provided by the burst signal S1. Consequently, the controller 40 can control the prepulse laser device 20A so as to apply the prepulsed laser beam PL to the droplet DL passing through the plasma generation region AR in the burst period PR1.

For example, the controller 40 outputs the burst signal S1 supplied from the exposure apparatus 10 to the main pulse laser device 20B. In addition to this, the controller 40 generates a second light emission trigger signal S20 when receiving the DL passage signal S2, delays the second light emission trigger signal S20 by a predetermined delay time using the delay circuit 41, and then outputs the signal S20 to the main pulse laser device 20B. The delay time is a time period slightly longer than the delay time set to the first light emission trigger signal S10. The main pulse laser device 20B is configured to emit the main pulsed laser beam ML after receiving an input of the second light emission trigger signal S20 in the burst period PR1, notification of which is provided by the burst signal S1. Consequently, the controller 40 can control the main pulse laser device 20B so as to apply the main pulsed laser beam ML to the dispersed droplet DL after the droplet DL passing through the plasma generation region AR is dispersed by the prepulsed laser beam PL.

For example, the controller 40 generates the imaging timing signal S3 when receiving the DL passage signal S2, delays the imaging timing signal S3 by a predetermined delay time using the delay circuit 41, and then outputs the signal S3 to the flash lamp 72 and the shutter 83. The delay time is set in such a manner that an image is captured at the timing corresponding to the timing immediately before or immediately after the prepulsed laser beam PL is applied to the droplet DL present in the plasma generation region AR, or an image is captured at the timing corresponding to the timing immediately after the main pulsed laser beam ML is applied to the droplet DL. Consequently, the controller 40 can control the image acquiring device 30B so as to acquire an image including an image immediately before or immediately after the prepulsed laser beam PL is applied to the droplet DL present in the plasma generation region AR. Alternatively, the controller can control the image acquiring device 30B so as to acquire an image including an image immediately after the main pulsed laser beam ML is applied to the droplet DL present in the plasma generation region AR.

Note that the controller 40 may be configured to control the target supply unit 3 based on the image signal S4 or any other signal in such a manner that the output timing and the output direction, for example, of the droplet DL are adjusted. The controller 40 may be configured to control the stage 5 based on the image signal S4 or any other signal in such a manner that the prepulsed laser beam PL and the main pulsed laser beam ML are applied to predetermined target positions in the plasma generation region AR. The control methods are merely examples. The control methods may be replaced by other control methods, or another control method may be added.

2.2 Operation

As described above, the burst signal S1 and the first light emission trigger signal S10 are outputted to the prepulse laser device 20A, and the burst signal S1 and the second light emission trigger signal S20 are outputted to the main pulse laser device 20B. In this case, the prepulsed laser beam PL and the main pulsed laser beam ML are alternately emitted in one pulse unit in the burst period PR1.

The prepulsed laser beam PL emitted from the prepulse laser device 20A is reflected off the reflective mirror 21. The prepulsed laser beam PL reflected off the reflective mirror 21 is reflected off the beam combiner 22, and enters the inside of the chamber 2 from the window W of the chamber 2. The prepulsed laser beam PL having entered the inside of the chamber 2 travels to the plasma generation region AR through the laser focusing optical system 4.

Here, the first light emission trigger signal S10 is delayed by a time period obtained such that a time period for which the prepulsed laser beam PL emitted from the prepulse laser device 20A reaches the plasma generation region AR is subtracted from a time period for which the droplet DL present in the detection region of the droplet detector 30A reaches the plasma generation region AR. Thus, when the droplet DL present in the detection region of the droplet detector 30A reaches the plasma generation region AR, the prepulsed laser beam PL is applied to the droplet DL that is a target substance, and the droplet DL is dispersed and turned into a dispersed target substance.

On the other hand, the main pulsed laser beam ML emitted from the main pulse laser device 20B is transmitted through the beam combiner 22. The main pulsed laser beam ML transmitted through the beam combiner 22 enters the inside of the chamber 2 from the window W of the chamber 2. The main pulsed laser beam ML having entered the inside of the chamber 2 travels to the plasma generation region AR through the laser focusing optical system 4.

Here, the second light emission trigger signal S20 is delayed by a time period slightly longer than the delay time set to the first light emission trigger signal S10. Thus, after the droplet DL present in the detection region of the droplet detector 30A reaches the plasma generation region AR and the droplet DL is dispersed by the prepulsed laser beam PL, the main pulsed laser beam ML is applied to the droplet DL that is the dispersed target substance. The dispersed target substance applied with the main pulsed laser beam ML is turned into plasma, and light including EUV light is emitted from the plasma. The EUV light is selectively reflected off a collector mirror, not shown, and guided to the exposure apparatus 10 on the outside of the chamber 2.

3. Comparative Example 3.1 Configuration of a Part of an Extreme Ultraviolet Light Generating Apparatus Next, as a comparative example with embodiments below, the configuration of a part of an extreme ultraviolet light generating apparatus will be described. Note that, configurations similar to the configurations described above are designated by the same reference signs, and redundant descriptions will be omitted unless otherwise specified.

Figure 3:
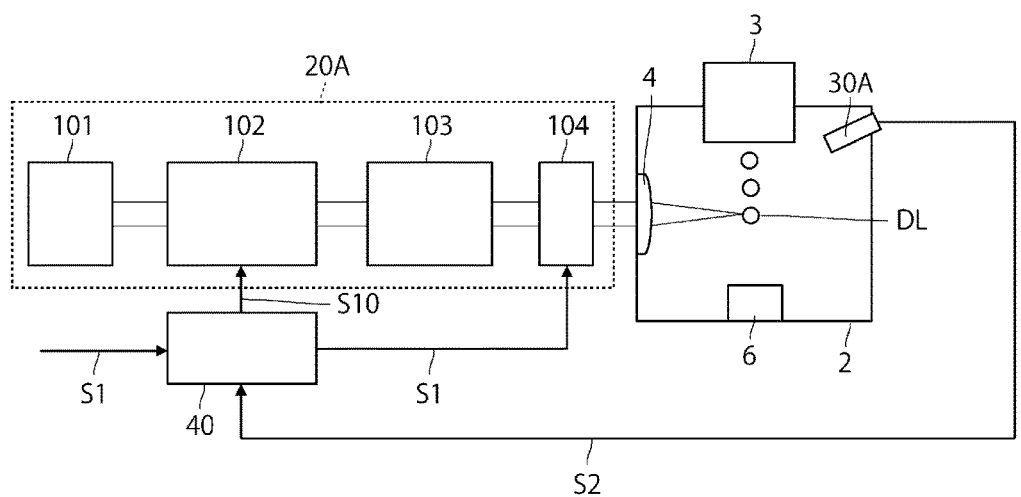
FIG. 3 is a schematic diagram of an exemplifying configuration of a part of an extreme ultraviolet light generating apparatus according to a comparative example.

As illustrated in FIG. 3, in the extreme ultraviolet light generating apparatus according to the comparative example, a prepulse laser device 20A includes an oscillator 101, a pulse pick 102, an amplifier 103, and an optical shutter 104. Note that in FIG. 3, for convenience, a reflective mirror 21, a beam combiner 22, a window W, and some other components are omitted.

The oscillator 101 is driven by a controller 40, and generates a laser beam at a repetition frequency of 20 MHz, for example. The oscillator 101 can be configured of a mode-locked laser or any other laser, for example.

The pulse pick 102 is an optical device that opens or closes the transmission line of a laser beam generated by the oscillator 101. The pulse pick 102 can be configured of an electrooptic (EO) device, a polarizer, or any other device. The pulse pick 102 opens or closes the transmission line of a laser beam in such a manner that a laser beam at a repetition frequency of about 20 to 100 kHz, for example, in synchronization with a DL passage signal S2 is outputted based on a first light emission trigger signal S10 supplied from the controller 40.

The amplifier 103 is configured to amplify the laser beam outputted from the pulse pick 102. The amplifier 103 can be configured of a power amplifier that is a regenerative amplifier type, for example.

The optical shutter 104 is an optical device that opens or closes the transmission line of the laser beam outputted from the amplifier 103. The optical shutter 104 can be configured of an EO device, a polarizer, or any other device, for example. The optical shutter 104 is configured to open or close the transmission line of a laser beam in such a manner that the laser beam is emitted in the burst period PR1 based on a burst signal S1 supplied from the controller 40, for example.

3.2 Operation

Figure 4A:
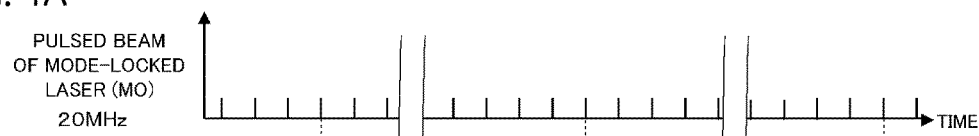
FIGS. 4A to 4E are timing charts of generating a pulsed laser beam in a burst operation.
Figure 4B:
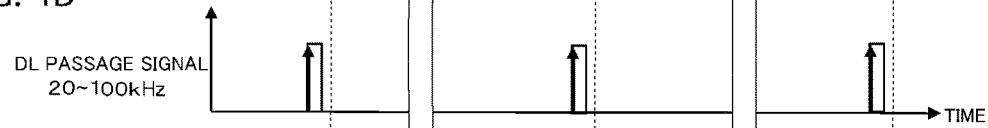
Figure 4C:

As illustrated in FIGS. 4A to 4E, after the controller 40 drives the oscillator 101, the oscillator 101 generates a laser beam at a repetition frequency of 20 MHz, for example, (FIG. 4A). The laser beam is a laser beam at a repetition frequency of about 20 to 100 kHz nearly synchronized with the DL passage signal S2 (FIG. 4B) by the pulse pick 102 (FIG. 4C). The laser beam is amplified at the amplifier 103.

Figure 4D:
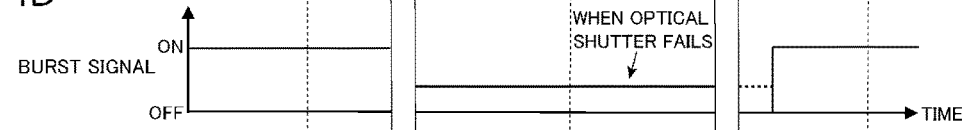
Figure 4E:
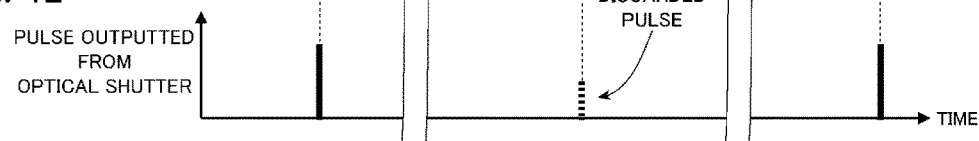

In the burst period PR1 of the burst signal S1 (FIG. 4D), the amplified laser beam is emitted as a prepulsed laser beam PL to a chamber 2 through the optical shutter 104 (FIG. 4E). On the other hand, in the idle period PR2 of the burst signal S1 (FIG. 4D), the amplified laser beam is blocked by the optical shutter 104, and the amplified laser beam is prevented from being transmitted to the chamber 2 (FIG. 4E).

The laser beam that is prevented from being transmitted to the chamber 2 is referred to as a discarded pulse.

As described above, the prepulse laser device 20A generates discarded pulses even in the idle period PR2 by operating the pulse pick 102 at almost a constant cycle. Thus, the prepulse laser device 20A consumes the laser gain of the oscillator 101 at a constant cycle to maintain the laser gain around a predetermined value, and thus stabilizes laser output energy.

3.3 Problem

However, in the prepulse laser device 20A according to the comparative example, the optical shutter 104 is sometimes opened due to the failure of the optical shutter 104, for example, although the period is the idle period PR2 of the burst signal S1 (this case is indicated by a broken line in FIG. 4D). In this case, although the period is the idle period PR2, a discarded prepulse laser beam is emitted from the prepulse laser device 20A, guided to the inside of the chamber 2 (this case is indicated by a broken line in FIG. 4E), and applied to a droplet DL present in a plasma generation region AR. On the other hand, since the period is the idle period PR2, no main pulsed laser beam ML is emitted from the main pulse laser device 20B.

Consequently, in the case in which the optical shutter 104 is opened although the period is the idle period PR2 of the burst signal S1, the droplet DL is not turned into plasma while being dispersed by the prepulsed laser beam PL. Consequently, a problem might occur in that the dispersed droplet DL is attached to components placed in the chamber 2, such as the windows W, W1 to W4 and the laser focusing optical system 4, resulting in a change in the reflectance and in the transmittance of the optical device. When such a problem occurs, there is a concern that the output of EUV light is reduced, or no EUV light is generated.

Therefore, embodiments below show exemplifying extreme ultraviolet light generating apparatuses that can reduce the contamination of optical devices due to an unintentionally dispersed droplet DL.

4. First Embodiment 4.1 Configuration of a Part of an Extreme Ultraviolet Light Generating Apparatus Next, as a first embodiment, the configuration of a part of an extreme ultraviolet light generating apparatus will be described. Note that, configurations similar to the configurations described above are designated by the same reference signs, and redundant descriptions will be omitted unless otherwise specified.

Figure 5:
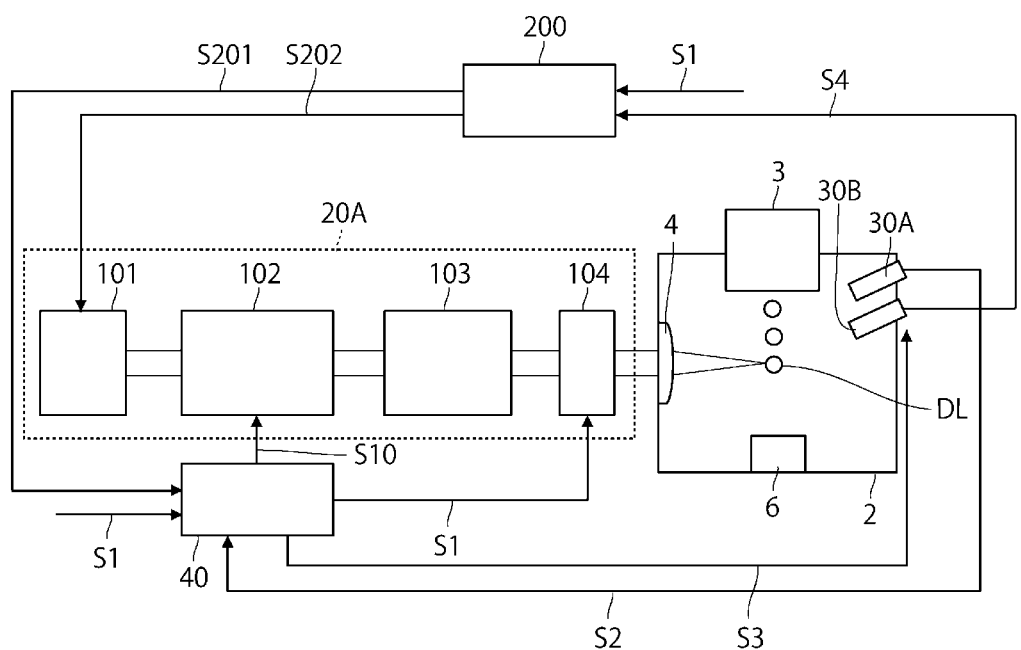
FIG. 5 is a schematic diagram of an exemplifying configuration of a part of an extreme ultraviolet light generating apparatus according to a first embodiment.

As illustrated in FIG. 5, the extreme ultraviolet light generating apparatus according to the embodiment is different from the extreme ultraviolet light generating apparatus according to the comparative example in that a controller 200 is included. To the controller 200, a burst signal S1 is inputted from an exposure apparatus 10, and an image signal S4 is inputted from an image acquiring device 30B.

The controller 200 determines whether a droplet DL passing through a plasma generation region AR in the idle period PR2 is in dispersion based on the burst signal S1 and the image signal S4. In the case in which the controller 200 determines that the droplet DL is in dispersion, the controller 200 stops the oscillator 101.

4.2 Operation

Figure 6:
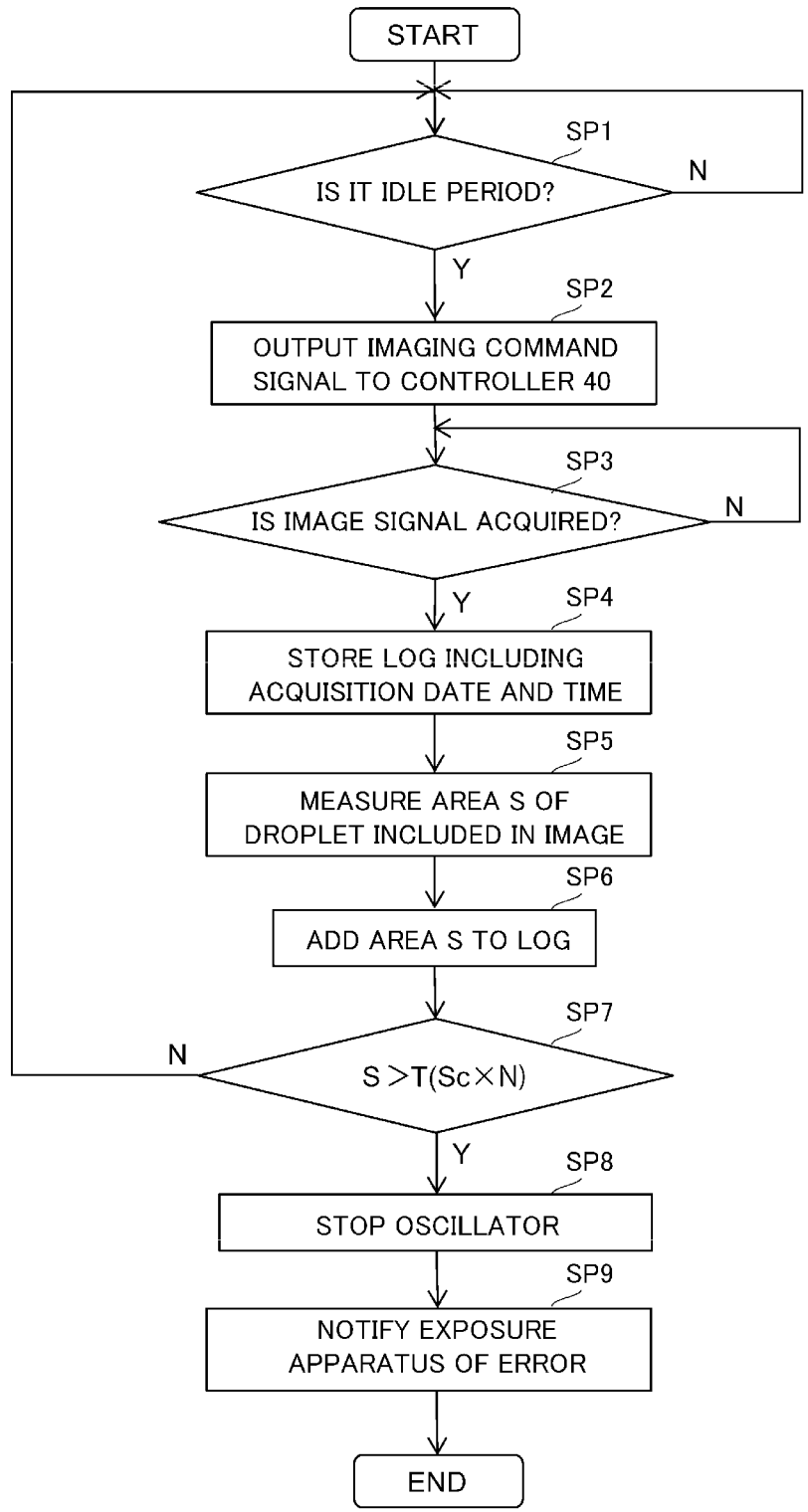
FIG. 6 is a flowchart of the procedures of the control process of a controller according to the first embodiment.

As illustrated in FIG. 6, the controller 200 starts the control process in response to powering on of the extreme ultraviolet light generating apparatus, for example, and goes to step SP1.

In step SP1, the controller 200 distinguishes between the burst period PR1 and the idle period PR2 based on the burst signal S1 outputted from the exposure apparatus 10. Here, in the case in which the period is the burst period PR1, the controller 200 waits for the idle period PR2. On the other hand, in the case in which the period is the idle period PR2, the controller 200 goes to step SP2.

In step SP2, the controller 200 generates an imaging command signal S201 to image the droplet DL passing through the plasma generation region AR, outputs the signal S201 to the controller 40, and then goes to step SP3. Note that in the controller 40, the image acquiring device 30B is controlled as described above in response to the imaging command signal S201, and the image signal S4 including the image of the droplet DL passing through the plasma generation region AR in the idle period PR2 is supplied from the image acquiring device 30B to the controller 200.

In step SP3, the controller 200 waits until the controller 200 acquires the image signal S4 supplied from the image acquiring device 30B. When acquiring the image signal S4, the controller 200 goes to step SP4.

In step SP4, the controller 200 generates a log signal including a date and time at which the image signal S4 is acquired in step SP3. After storing the signal on the internal memory or the external storage device of the controller 200, for example, the controller 200 goes to step SP5. Note that the log signal is used, for example, in the case of estimating the time in which an optical shutter 104 of a prepulse laser device 20A fails. Step SP4 may be omitted.

In step SP5, the controller 200 subjects the image signal S4 acquired in step SP3 to a binarization process. After measuring an area S of the droplet DL included in a binary image obtained as a result of the binarization process, the controller 200 goes to step SP6.

Figure 7:
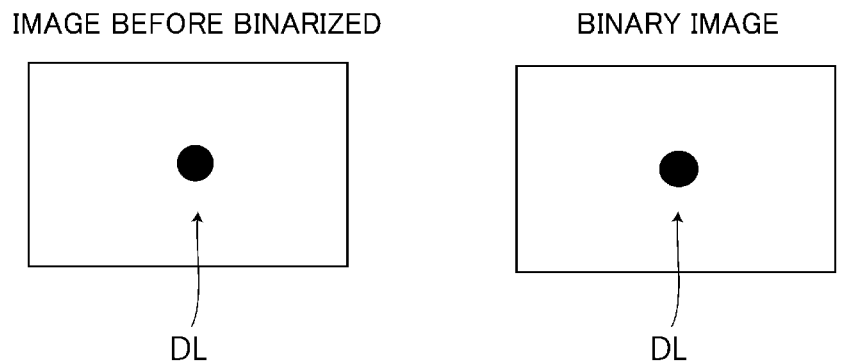
FIG. 7 is a diagram illustrating an image including a droplet applied with no prepulsed laser beam and its binary image.
Figure 8:
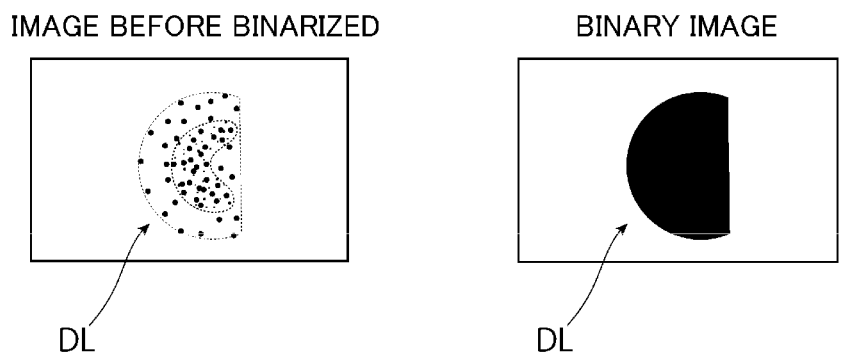
FIG. 8 is a diagram illustrating an image including a droplet applied with a prepulsed laser beam and its binary image.

As illustrated in FIG. 7 as examples, in the case in which no prepulsed laser beam PL is applied to the droplet DL passing through the plasma generation region AR, the droplet DL included in the image signal S4 has a nearly circular shape. In the binary image of the image signal S4 obtained as a result of the binarization process, the droplet DL is depicted in black, and the portions other than the droplet DL are depicted in white. On the other hand, in the case in which the prepulsed laser beam PL is applied to the droplet DL passing through the plasma generation region AR, the droplet DL is hemispherically dispersed in the application direction of the prepulsed laser beam PL. As illustrated in FIG. 8 as examples, in the case in which the prepulsed laser beam PL is applied to the droplet DL, the droplet DL included in the image signal S4 has a nearly semicircular shape. In the binary image of the image signal S4 obtained as a result of the binarization process, the outermost dispersed particles of the imaged droplet DL form the outer edge, the inside is depicted in black, and the outside of the outer edge is depicted in white.

As apparent from the comparison of FIG. 7 with FIG. 8, in the case in which the image signal S4 acquired in step SP3 is subjected to the binarization process, the outline (the boundary) of the droplet DL is clearly distinguishable regardless of the presence or absence of dispersion, compared with the case in which no binarization process is applied. Consequently, the controller 200 can correctly measure the area S of the droplet DL by subjecting the image signal S4 acquired in step SP3 to the binarization process. However, subjecting the image signal S4 acquired in step SP3 to the binarization process is not necessarily required.

The area of the droplet DL included in the image of the image signal S4 may be measured by another image processing.

In step SP6, the controller 200 adds the area S of the droplet DL measured in step SP5 to log information stored in step SP3, and goes to step SP7. Note that step SP6 may be omitted.

In step SP7, the controller 200 compares the area S of the droplet DL measured in step SP5 with a threshold T. As apparent from the comparison of FIG. 7 with FIG. 8, in the case in which the prepulsed laser beam PL is applied to the droplet DL passing through the plasma generation region AR, the black portion corresponding to the droplet DL is larger than in the case in which no prepulsed laser beam PL is applied.

Thus, the threshold T is the maximum value acceptable as the area of the droplet DL when no prepulsed laser beam PL is applied. Specifically, the threshold T is a value N times a standard area Sc of the droplet DL included in the image of the image signal S4, for example. Note that the threshold T may be stored on the internal memory of the controller 200, for example, or may be read out of another storage device other than the controller 200.

In the case in which the area S of the droplet DL measured in step SP5 is the threshold T or less, this means that no prepulsed laser beam PL is emitted from the prepulse laser device 20A in the idle period PR2, and the optical shutter 104 of the prepulse laser device 20A is normally operated. In this case, the controller 200 returns to step SP1.

On the other hand, in the case in which the area S of the droplet DL is greater than the threshold T, this means that the prepulsed laser beam PL is emitted from the prepulse laser device 20A in the idle period PR2, and the optical shutter 104 of the prepulse laser device 20A is highly likely to fail. In this case, the controller 200 goes to step SP8.

In step SP8, the controller 200 generates a stop command signal S202, outputs the signal S202 to the oscillator 101 to stop the oscillator 101, and then goes to step SP9. In the case in which the oscillator 101 is stopped, no prepulsed laser beam PL is emitted from the prepulse laser device 20A in the idle period PR2. Thus, the intensity of the prepulsed laser beam PL entering the inside of the chamber 2 is zero. The method of stopping the oscillator 101 is replaceable by a method with which in the idle period PR2, the intensity of the prepulsed laser beam PL emitted from the prepulse laser device 20A is reduced to the degree that the droplet DL is not dispersed by applying the prepulsed laser beam PL. For example, instead of stopping the oscillator 101, the pumped current of the oscillator 101 may be decreased.

In step SP9, the controller 200 generates a notification signal indicating that there is a possibility of the occurrence of an abnormality in the optical shutter 104, outputs the signal to the exposure apparatus 10, and then ends the control process. Note that, instead of the exposure apparatus 10, or in addition to the exposure apparatus 10, the controller 200 may notify an apparatus other than the exposure apparatus 10 or an operator that there is a possibility of the occurrence of an abnormality in the optical shutter 104 using signal outputs, sounds, images, or any other schemes.

4.3 Effect

In the extreme ultraviolet light generating apparatus according to the embodiment, in the case in which the area S of the droplet DL, which is detected at the image acquiring device 30B of the target detector 30 in the idle period PR2, is greater than the threshold T, the controller 200 stops the oscillator 101, which is a light source.

As described above, in the case in which the area S of the droplet DL is greater than the threshold T, the prepulsed laser beam PL is emitted from the prepulse laser device 20A in the idle period PR2. The optical shutter 104 of the prepulse laser device 20A is highly likely to fail.

Since the oscillator 101 is stopped even in this case, the prepulsed laser beam PL emitted from the prepulse laser device 20A is prevented from being guided to the inside of the chamber 2 in the idle period PR2. Consequently, the continuous attachment of the dispersed droplet DL to components placed in the chamber 2, such as the windows W, W1 to W4, and the laser focusing optical system 4, is avoided. As described above, the extreme ultraviolet light generating apparatus according to the embodiment enables a reduction in the contamination of the optical devices.

5. Second Embodiment 5.1 Configuration of a Part of an Extreme Ultraviolet Light Generating Apparatus Next, as a second embodiment, the configuration of a part of an extreme ultraviolet light generating apparatus will be described. Note that, configurations similar to the configurations described above are designated by the same reference signs, and redundant descriptions will be omitted unless otherwise specified.

Figure 9:
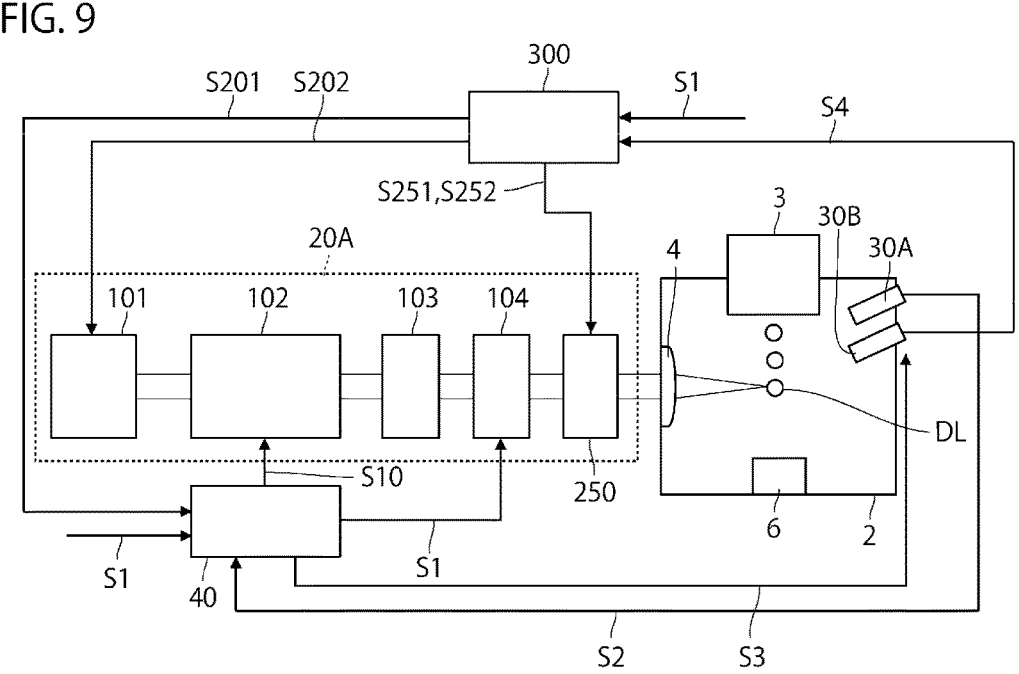
FIG. 9 is a schematic diagram of an exemplifying configuration of a part of an extreme ultraviolet light generating apparatus according to a second embodiment.

As illustrated in FIG. 9, the extreme ultraviolet light generating apparatus according to the embodiment is different from the extreme ultraviolet light generating apparatus according to the comparative example in that a secondary shutter 250 and a controller 300 are included. The secondary shutter 250 is configured to open or close the transmission line of a laser beam emitted from an optical shutter 104. The secondary shutter 250 can be configured of an EO device, a polarizer, an acousto-optic modulator (AOM), and a mechanical shutter, for example. The secondary shutter 250 is closed in response to a close command signal S251 supplied from the controller 300, and opened in response to an open command signal S252 supplied from the controller 300.

Note that, in the embodiment, the secondary shutter 250 is placed between the optical shutter 104 and a window W. However, the secondary shutter 250 may be placed between the window W and a laser focusing optical system 4, for example. In short, the secondary shutter 250 only has to be placed on the transmission line of a laser beam emitted from the optical shutter 104.

Similarly to the controller 200 of the first embodiment, the controller 300 determines whether a droplet DL passing through a plasma generation region AR in the idle period PR2 is in dispersion based on a burst signal S1 and an image signal S4. Similarly to the controller 200 of the first embodiment, in the case in which the controller 300 determines that the droplet DL passing through the plasma generation region AR in the idle period PR2 is in dispersion, the controller 300 stops an oscillator 101. Note that, in the embodiment, stopping the oscillator 101 is not necessarily required.

In the case in which the controller 300 determines that the droplet DL passing through the plasma generation region AR in the idle period PR2 is in dispersion, the controller 300 generates the close command signal S251, and outputs the signal S251 to the secondary shutter 250 to close the secondary shutter 250. The controller 300 is different from the controller 200 of the first embodiment in this point. In the case in which the secondary shutter 250 is configured including an EO device and a polarizer, slight leaked light may be transmitted through the secondary shutter 250 and applied to the droplet DL even though the secondary shutter 250 is closed. In this case, the leaked light only has to have intensity reduced to the extent that the droplet DL is not dispersed.

5.2 Operation

Figure 10:
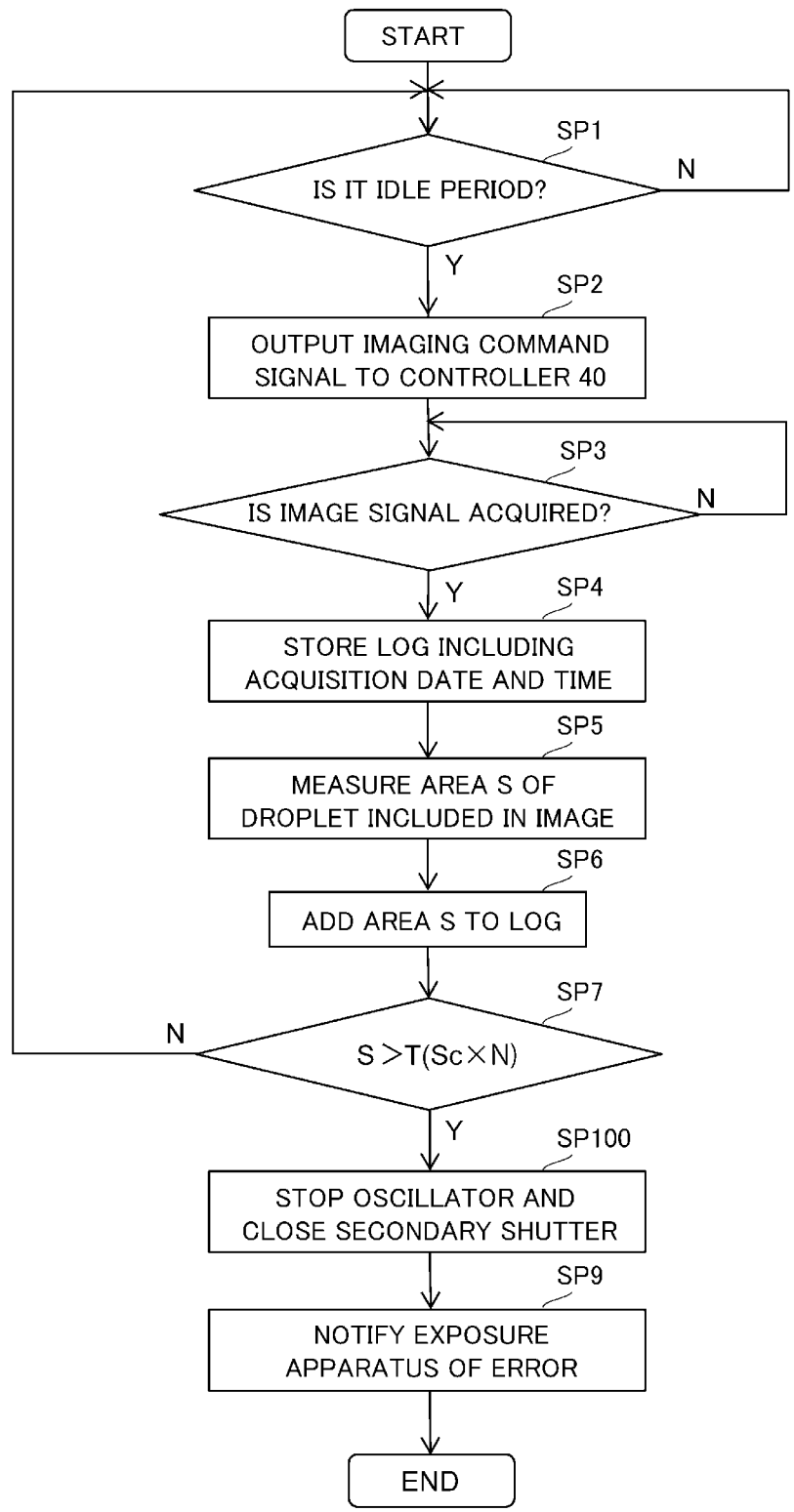
FIG. 10 is a flowchart of the procedures of the control process of a controller according to the second embodiment.

As illustrated in FIG. 10, in the embodiment, step SP8 of the first embodiment illustrated in FIG. 6 is changed to step SP100. In step SP100, the controller 300 outputs a stop command signal S202 to the oscillator 101 to stop the oscillator 101, and outputs the close command signal S251 to the secondary shutter 250 to close the secondary shutter 250. After that, the controller 300 goes to step SP9. Note that in step SP100, the oscillator 101 may not be stopped as described above.

5.3 Effect

In the extreme ultraviolet light generating apparatus according to the embodiment, the controller 300 stops the oscillator 101, and closes the secondary shutter 250 in the case in which the area S of the droplet DL, which is detected at the image acquiring device 30B in the idle period PR2, is greater than the threshold T.

Thus, similarly to the first embodiment, in the idle period PR2, the prepulsed laser beam PL emitted from a prepulse laser device 20A is prevented from being guided to the inside of a chamber 2. Consequently, the continuous attachment of the dispersed droplet DL to components placed in the chamber 2, such as the windows W, W1 to W4, and the laser focusing optical system 4, is avoided. As described above, the extreme ultraviolet light generating apparatus according to the embodiment also enables a reduction in the contamination of the optical devices.

Note that, in the embodiment, a configuration may be provided such that after closing the secondary shutter 250, the controller 300 outputs the open command signal S252 to open the secondary shutter 250 in the burst period PR1 of the burst signal S1, and outputs the close command signal S251 to close the secondary shutter 250 in the idle period PR2. With this configuration, even in the case in which the optical shutter 104 fails, the burst operation is continuously performed based on the burst signal S1 by the secondary shutter 250 instead of the optical shutter 104. Consequently, the extreme ultraviolet light generating apparatus can be prevented from being immediately stopped in the case in which the optical shutter 104 fails.

6. Exemplifying Modification

As described above, the foregoing embodiments are described as examples. Here, the present invention is not limited to the foregoing embodiments. The foregoing embodiments may be modified.

For example, in the first embodiment, the controller 40 and the controller 200 are separately provided. In the second embodiment, the controller 40 and the controller 300 are separately provided. However, the controller 40 and the controller 200, or the controller 40 and the controller 300, may be configured as one controller.

Figure 11:
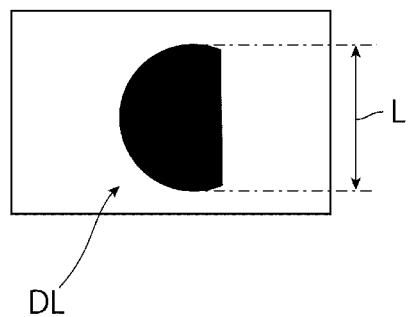
FIG. 11 is a diagram of another exemplifying measurement of a droplet included in a binary image.

In the foregoing embodiments, the area S of the droplet DL included in the binary image is adopted as information to determine that the droplet DL passing through the plasma generation region AR in the idle period PR2 is in dispersion. However, for example, as illustrated in FIG. 11, a length L of the droplet DL included in the binary image may be adopted. For example, the length L is the longest length in a predetermined direction orthogonal to the application direction. In the case in which the length L is greater than a threshold, it is determined that the droplet DL passing through the idle period PR2 is in dispersion. For example, the threshold is the maximum value acceptable as the length L of the droplet DL included in the binary image when no prepulsed laser beam PL is applied. With this configuration, similarly to the foregoing embodiments, it can be determined whether the droplet DL passing through the plasma generation region AR in the idle period PR2 is in dispersion based on the length L of the droplet DL included in the binary image.

Information other than the threshold may be adopted for comparison with the area S or the length L of the droplet DL included in the binary image. For example, as the area S or the length L of the droplet immediately before applying the prepulsed laser beam PL is a reference, which is included in the image of the image signal S4 having been acquired at the image acquiring device 30B in the burst period PR1, an area S or a length L that is N times the reference can be adopted for comparison.

In the foregoing embodiments, in the case in which the area S of the droplet DL that is detected in the idle period PR2 is greater than the threshold T, the oscillator 101 is stopped. However, instead of stopping the oscillator 101, the amplifier 103 may be stopped. In the case in which the amplifier 103 is stopped, although the prepulsed laser beam PL emitted from the prepulse laser device 20A is guided to the inside of the chamber 2 in the idle period PR2, the prepulsed laser beam PL is not amplified, and its intensity is weakened. The prepulsed laser beam PL passes through the medium that is not pumped in the amplifier 103, and thus the beam PL can be attenuated. Consequently, even though the prepulsed laser beam PL is applied to the droplet DL, the droplet DL is prevented from being dispersed. Similarly to the foregoing embodiments, the continuous attachment of the dispersed droplet DL to components placed in the chamber 2, such as the windows W, W1 to W4, and the laser focusing optical system 4, is avoided.

In the foregoing embodiments, information that determines whether the droplet DL passing through the plasma generation region AR in the idle period PR2 is in dispersion is acquired at the image acquiring device 30B of the target detector 30. However, instead of the image acquiring device 30B, the droplet detector 30A can be adopted. For example, in the case in which the optical sensor 63 of the droplet detector 30A is a line sensor placed along the trajectory OT, information equivalent to the length L of the droplet DL can be obtained from the line sensor. Consequently, it can be determined whether the droplet DL passing through the plasma generation region AR in the idle period PR2 is in dispersion.

As described above, the embodiments of the present disclosure can adopt the controller that reduces the intensity of the pulsed laser beam entering the inside of the chamber 2 from the laser device 20 in the case in which the size of the target substance detected at the target detector 30 in the idle period PR2 is greater than a predetermined size.

The description above is merely examples, not limitation. Thus, it is apparent to a person skilled in the art that the embodiments of the present disclosure can be modified and altered without deviating from the scope of the appended claims.

The terms used throughout the specification and the appended claims should be interpreted as "non-limiting" terms. For example, the term "to include" or "to be included" should be interpreted to include non-limiting components. The term "to have" should be interpreted to have non-limiting components. The indefinite articles "a"

and "an" described in the specification and the appended claims should be interpreted as meaning "at least one" or "one or more".

What is claimed is:

1. An extreme ultraviolet light generating apparatus comprising:
a laser device configured to emit a pulsed laser beam;
a target detector configured to detect a target substance supplied as an application target for the laser beam to an inside of a chamber; and
a controller configured to control the laser device based on a burst signal in which are repeated a burst period for which to generate an extreme ultraviolet light beam and an idle period for which to pause the generation of the extreme ultraviolet light beam,
the controller reducing an intensity of a laser beam entering the inside of the chamber from the laser device, when a size of a target substance detected at the target detector in the idle period is greater than a predetermined size.

2. The extreme ultraviolet light generating apparatus according to claim 1, wherein
the laser device includes an oscillator configured to generate the laser beam, and
when a size of a target substance detected at the target detector in the idle period is greater than the predetermined size, the controller stops the oscillator.

3. The extreme ultraviolet light generating apparatus according to claim 1, wherein
the laser device includes
an oscillator configured to generate the laser beam,
an amplifier configured to amplify the laser beam generated by the oscillator,
an optical shutter configured to open or close a transmission line of a laser beam outputted from the amplifier, and
a secondary shutter placed on a propagation path of a laser beam emitted from the optical shutter, and
when a size of a target substance detected at the target detector in the idle period is greater than the predetermined size, the controller closes the secondary shutter.

4. The extreme ultraviolet light generating apparatus according to claim 3, wherein,
after closing the secondary shutter, the controller opens the secondary shutter in the burst period and closes the secondary shutter in the idle period based on the burst signal.

5. The extreme ultraviolet light generating apparatus according to claim 1, wherein
the laser device includes
an oscillator configured to generate the laser beam, and
an amplifier configured to amplify the laser beam generated by the oscillator, and
when a size of a target substance detected at the target detector in the idle period is greater than the predetermined size, the controller stops the amplifier.

6. The extreme ultraviolet light generating apparatus according to claim 1, wherein
the laser device includes a prepulse laser device and a main pulse laser device, and
the controller controls the laser device in a manner such that after applying a prepulsed laser beam emitted from the prepulse laser device to a target substance supplied to the inside of the chamber, the laser device applies a main pulsed laser beam emitted from the main pulse laser device to the target substance.

7. A method for controlling an extreme ultraviolet light generating apparatus comprising:
detecting a target substance supplied as an application target for a laser beam to an inside of a chamber in an idle period, of the idle period for which generation of the extreme ultraviolet light beam has to be paused and a burst period for which an extreme ultraviolet light beam has to be generated; and
reducing an intensity of a laser beam entering the inside of the chamber when a size of the target substance is greater than a predetermined size.

* * * * *